United States Patent
Wallace

(10) Patent No.: US 7,789,166 B2
(45) Date of Patent: Sep. 7, 2010

(54) ROOT-CROP HARVESTER WITH RECIRCULATION MECHANISM

(75) Inventor: Richard Wallace, American Falls, ID (US)

(73) Assignee: Apache River, LLC, American Falls, ID (US)

(*) Notice: Subject to any disclaimer, the term of this patent is extended or adjusted under 35 U.S.C. 154(b) by 262 days.

(21) Appl. No.: 11/611,731

(22) Filed: Dec. 15, 2006

(65) Prior Publication Data
US 2008/0146300 A1 Jun. 19, 2008

(51) Int. Cl.
*A01D 13/00* (2006.01)
(52) U.S. Cl. .................. 171/14; 171/23; 171/138
(58) Field of Classification Search ........... 171/138, 171/23, 110, 130, 14; 56/16.6; 198/347.1, 198/347.4, 348, 360, 361, 369.2, 369; 414/252, 414/285, 350, 351, 365, 397, 391, 416.05, 414/480, 489, 523, 525.3, 615
See application file for complete search history.

(56) References Cited

U.S. PATENT DOCUMENTS

| | | | | |
|---|---|---|---|---|
| 994,513 | A * | 6/1911 | Herbert | 171/118 |
| 1,020,909 | A * | 3/1912 | Johnston | 414/299 |
| 1,534,023 | A * | 4/1925 | Betton | 193/14 |
| 2,015,549 | A * | 9/1935 | Dwyer et al. | 171/18 |
| 2,209,282 | A * | 7/1940 | Rodin | 171/15 |
| 2,693,068 | A * | 11/1954 | Rodin | 171/17 |
| 2,777,266 | A * | 1/1957 | Middleton et al. | 171/14 |
| 3,128,485 | A * | 4/1964 | Bradshaw et al. | 15/3.14 |
| 3,200,888 | A * | 8/1965 | Lehde et al. | 171/14 |
| 3,469,383 | A * | 9/1969 | Manfre | 56/327.1 |
| 3,654,997 | A * | 4/1972 | Partyanko et al. | 171/58 |
| RE29,121 | E * | 1/1977 | Hook et al. | |
| 4,011,935 | A * | 3/1977 | Massey | 198/369.2 |
| 4,560,008 | A | 12/1985 | Carruthers | |
| 4,699,218 | A * | 10/1987 | Schwitters | 171/23 |
| 4,733,768 | A * | 3/1988 | Aquino et al. | 198/369.2 |
| 4,798,248 | A * | 1/1989 | Schwitters | 171/1 |
| 4,842,076 | A * | 6/1989 | Welp | 171/124 |
| 4,938,336 | A * | 7/1990 | Aquino et al. | 198/369.2 |
| 4,942,927 | A * | 7/1990 | Halfmann | 171/58 |
| 5,078,255 | A * | 1/1992 | Haley | 198/358 |
| 5,421,446 | A * | 6/1995 | Koch et al. | 198/369.7 |
| 5,528,890 | A * | 6/1996 | Gray et al. | 56/16.6 |
| 6,068,059 | A * | 5/2000 | Bajema et al. | 171/130 |

(Continued)

FOREIGN PATENT DOCUMENTS

FR 2652707 A1 * 4/1991

*Primary Examiner*—Robert E Pezzuto
*Assistant Examiner*—Jamie L McGowan
(74) *Attorney, Agent, or Firm*—Workman Nydegger

(57) ABSTRACT

A root-crop harvester is configured to temporarily store tubers by recirculating tubers on the conveyor system of the harvester. The conveyor system has selectable first and second operating configurations. In the first operating configuration the conveyor system transports tubers from the digger bed to an outlet where tubers are unloaded from the harvester (e.g., onto a truck). In the second operating configuration the conveyor system transports tubers along the conveyor system for a period of time and then diverts tubers to an earlier position within the conveyor system, thereby recirculating tubers on the harvester. After a period of time, the harvester operator selects the first operating configuration and the recirculating tubers along with newly dug tubers are unloaded from the harvester.

20 Claims, 10 Drawing Sheets

U.S. PATENT DOCUMENTS 6,776,277 B2 * 8/2004 Wiehler ................... 198/369.2
6,866,135 B2 * 3/2005 Quadracci et al. ........ 198/369.7
7,165,628 B2 * 1/2007 Taylor et al. ................. 171/129
7,178,658 B2 * 2/2007 Philipp .................... 198/347.1

* cited by examiner

ROOT-CROP HARVESTER WITH RECIRCULATION MECHANISM

BACKGROUND OF THE INVENTION

1. The Field of the Invention

The present invention relates to root-crop harvesters (e.g., potato harvesters). More particularly, the present invention relates to root-crop harvesters that can temporarily store an amount of crops while harvesting.

2. Related Technology

Modern potato harvesters are very efficient at digging large amounts of potatoes from a field, separating the potatoes from the dirt and vines, and then loading the potatoes on a truck. In many respects the technology for harvesting potatoes has kept pace with the high yield per acre that modern farming techniques now provide.

Most potato harvesters operate by cutting through the ground with a digger blade and forcing the dirt and potatoes over a series of chains that transport the potatoes while removing the dirt and vines. The potatoes are elevated by the chains and other conveyers so that they can reach a sufficient height to be dumped into a truck and hauled away.

Root crops such as potatoes are relatively heavy and high volume compared to other types of crops (e.g., grains). Consequently, it is generally not feasible to store a significant percentage of the crop as it is being harvested. Instead, trucks follow along side the harvester so that the potatoes or other tubers can be simultaneously dug and loaded on the truck.

While tandem operation of the harvester and trucks works well most of the time, there are times when it is desirable to temporarily continue digging potatoes without a truck. For instance, when one truck is full, there is a brief period of time where the potato harvester needs to stop to switch trucks. Even if the trucks can be switched in a few seconds, halting the potato harvester is very inconvenient because the potato harvester is often loaded with thousands of pounds of potatoes, has many moving parts, and has a blade that is buried in the ground. Consequently, starting and stopping the harvester while digging is hard on equipment and inconvenient for the operators.

In addition to exchanging trucks, there are other times where it is desirable to continue operating the harvester without a truck alongside. For example, a harvester may need to pass through a muddy area where a truck may get stuck. The ability to dig without unloading potatoes from the harvester allows the potatoes to be dug while the truck drives around the problem area. The problem with digging the crop without simultaneous loading is that it requires some kind of storage for the crop being dug.

Attempts have been made to provide potato harvesters that can temporarily store potatoes on the harvester. In most cases, these harvesters have a storage bin. The storage bin is placed just before the boom that transports potatoes to the truck. To operate the harvester without a truck along side, the conveyor on the boom is halted while the rest of the digger continues operation. Potatoes pile up in the storage bin until a truck can return and the boom conveyer is again operated.

The problem with using storage bins is that most storage bins must be very large to provide the desired delay in unloading. When these bins are full, they can cause uneven weight distributions, make the harvester top heavy, and/or affect the harvester's digging performance. In addition, the large bins often block the operator's view of many parts of the harvester thereby making it more difficult to monitor the harvester.

BRIEF SUMMARY OF THE INVENTION

Embodiments of the invention relate to root-crop harvesters capable of digging tubers and temporarily storing an amount of tubers on the harvester. The tubers are temporarily stored on the root-crop harvester by recirculating the tubers on the conveyor system of the harvester.

In one embodiment, the root-crop harvester includes a frame that supports a digger bed configured to unearth tubers. The unearthed tubers are transported from the digger bed along a conveyor system where the tubers are separated from dirt, rocks, and/or vines.

The conveyor system has selectable first and second operating configurations. In the first operating configuration the conveyor system transports tubers from the digger bed along the conveyor system to an outlet where tubers are unloaded from the harvester (e.g., onto a truck). In the second operating configuration the conveyor system transports tubers along the conveyor system for a period of time and then diverts tubers to an earlier position within the conveyor system, thereby recirculating tubers on the harvester. The recirculating tubers are transported through the harvester simultaneously with newly dug tubers, thereby temporarily storing the recirculating tubers on the harvester. After a period of time, the harvester operator selects the first operating configuration and the recirculating tubers along with newly dug tubers are unloaded from the harvester.

Recirculating tubers on the harvester allows the harvester to temporarily continue digging tubers without unloading. This configuration allows the harvester to temporarily operate without a truck moving along side to receive the crop. The harvester can continue digging in this configuration until the conveyor system is loaded with a maximum amount of tubers and/or until the harvester operator selects the first operating configuration and begins unloading the tubers.

In one examplary embodiment the root crop harvester has a conveyor system that includes (i) a digger bed for separating tubers from dirt, (ii) an elevator conveyor that raises the tubers to a height that is greater than the height of the digger bed, (iii) a boom conveyor that unloads tubers from the harvester, and (iv) a return-flow conveyor positioned between the elevator conveyor and the boom conveyor for diverting tubers.

The return-flow conveyor is selectively movable between a first position and a second position. In the first position, tubers on the return-flow conveyor are dumped onto the boom conveyor where they are unloaded from the harvester. With the return-flow conveyor in the second position, the tubers on the return-flow conveyor are dropped onto the digger bed or onto the ground just in front of the digger bed such that the potatoes are recirculated through the conveyor system of the harvester.

In one embodiment, the return-flow conveyor includes a roller assembly positioned within the loop of the conveyor belt. The roller assembly includes one or more roller mounting brackets and a plurality of rollers connected to the brackets. The roller assembly pivots within the conveyor belt to change the direction of flow of tubers traveling on the conveyor. While in the boom loading configuration, one or more rollers of the assembly position the conveyor belt to load tubers onto the boom that directs tubers to the outlet of the conveyor system. In the return-flow configuration one or more rollers of the assembly position the conveyor belt to return potatoes to an earlier point in the conveyor system.

The harvesters of the invention advantageously allow a harvester operator to temporarily continue harvesting without unloading the crop. One advantage of storing tubers using recirculation is that the weight of the crop is more evenly distributed on the harvester. The even distribution of crops on the harvester helps to keep the harvester balanced.

Another advantage of the temporary storage mechanism of the invention is that it utilizes excess harvester capacity. Harvesters are typically over designed such that they can handle highly variable harvesting conditions. Consequently, in most circumstances, the harvester is operated at less than full loading capacity. The recirculation mechanism of the invention can utilize this excess loading capacity for temporarily storing the crop.

These and other advantages and features of the present invention will become more fully apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

Embodiments of the invention relate to root-crop harvesters that can temporarily continue digging a crop without unloading crop onto a truck. The root crop harvesters temporarily store the root crop on the harvester by recirculating dug crops on the conveyor system of the harvester. The temporary storage mechanism of the invention can be used on any type of root crop harvester including, but not limited to, harvesters that dig potatoes, carrots, onions, and the like.

For purposes of this invention, the terms "unearthing tubers" refers to both uprooting tubers out of the ground and scooping tubers that are on top of the ground (e.g., potatoes that have been piled from a windrower).

Figure 1:
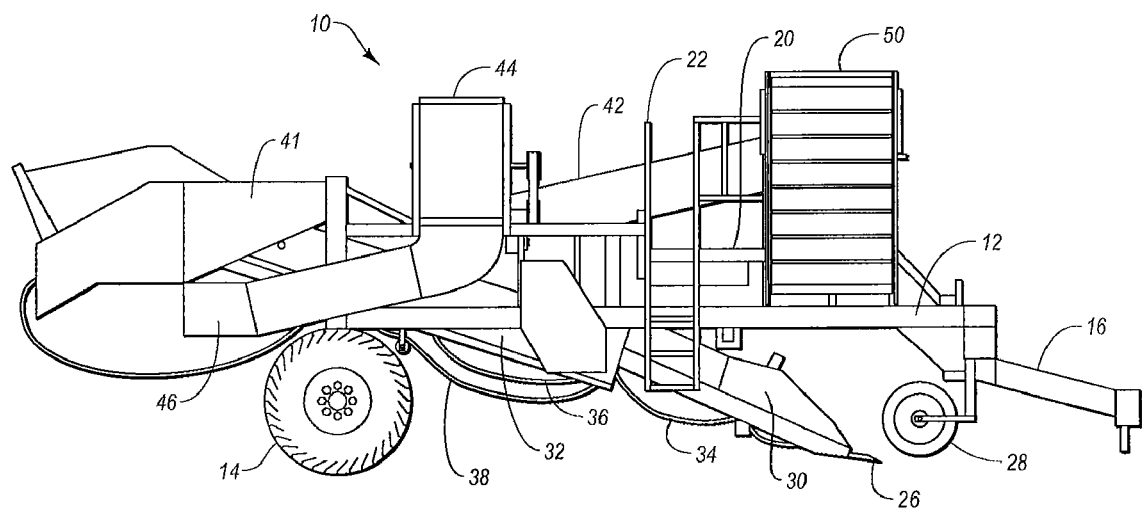
FIG. 1 illustrates an examplary harvester according to one embodiment of the invention.

FIG. 1 illustrates a potato harvester 10 according to one embodiment of the invention. Although FIG. 1 and the written description relating to FIG. 1 are directed to a potato harvester, those skilled in the art will understand that this and other embodiments of the invention can be carried out on harvesters used to harvest other types of root crops, including carrots, onions, turnips and radishes.

Potato harvester 10 includes a frame 12 that is supported by wheel and axle assembly 14. Frame 12 provides a structure that supports a conveyor system 18 (FIG. 2) for unearthing potatoes and separating the potatoes from dirt, rocks, and vines. Harvester 10 can include platforms (e.g., platform 20), ladders (e.g., ladder 22), coverings for providing shade, and other structures that allow an operator to access the various parts of the harvester and/or for allowing manual laborers to clean clods and rocks from the potatoes being harvested. Harvester 10 also includes a hitch 16 that allows the harvester to be attached to a tractor and pulled through a field.

Harvester 10 includes a digger bed 24 that is configured to dig and/or scoop potatoes from the ground. A digger blade 26 is positioned on the leading edge of digger bed 24. The height of the digger bed and digger blade can be adjustable such that the digging depth can be controlled by a harvester operator. During operation of harvester 10, digger blade 26 cuts through the soil to scoop potatoes and soil. A coulter wheel 28 can be positioned ahead of digger bed 24 for cutting vines and loosening the soil at the lateral edge of digger bed 24.

Digger bed 24 includes a primary conveyor 30 and a secondary conveyor 32. Primary conveyor 30 includes a primary chain 34 and sidewalls that direct and move dirt, vines, and potatoes from the digger blade toward the back of the harvester. The primary chains provide the initial sifting of the dirt and potatoes, allowing dirt to fall through the chains while the potatoes ride on the chains to the secondary conveyor.

The secondary conveyor includes a secondary chain 36 and a vine chain 38. Secondary chains 36 provide additional dirt separation from the potatoes. The vine chains 38 have wide links that allow potatoes to fall through them but tend to catch vines, which are longer and lighter. Vine chain 38 extends around secondary chains 38 and exits the back of harvester 10, carrying vines with it.

A cross conveyor 40 (FIG. 2) is positioned within housing 41. Cross conveyor 40 receives potatoes from secondary conveyor 32 of digger bed 24 and carries them to elevator conveyor 42. Harvester 10 can also include a blower 44 for assisting in the removal of vines. Blower 44 is coupled to a plenum 46 that delivers air through potatoes moving between secondary conveyor 32 and cross conveyor 40. The air blowing through the potatoes can remove pieces of vine that fall through vine chain 38.

The potatoes traveling on cross conveyor 40 are dumped onto elevator conveyor 42. Elevator conveyor 42 raises the potatoes in elevation relative to the ground. Elevating the potatoes allows the potatoes to be transported across and above the digger bed 24 and positions the potatoes at a higher elevation for loading the potatoes into a truck.

Figure 2:
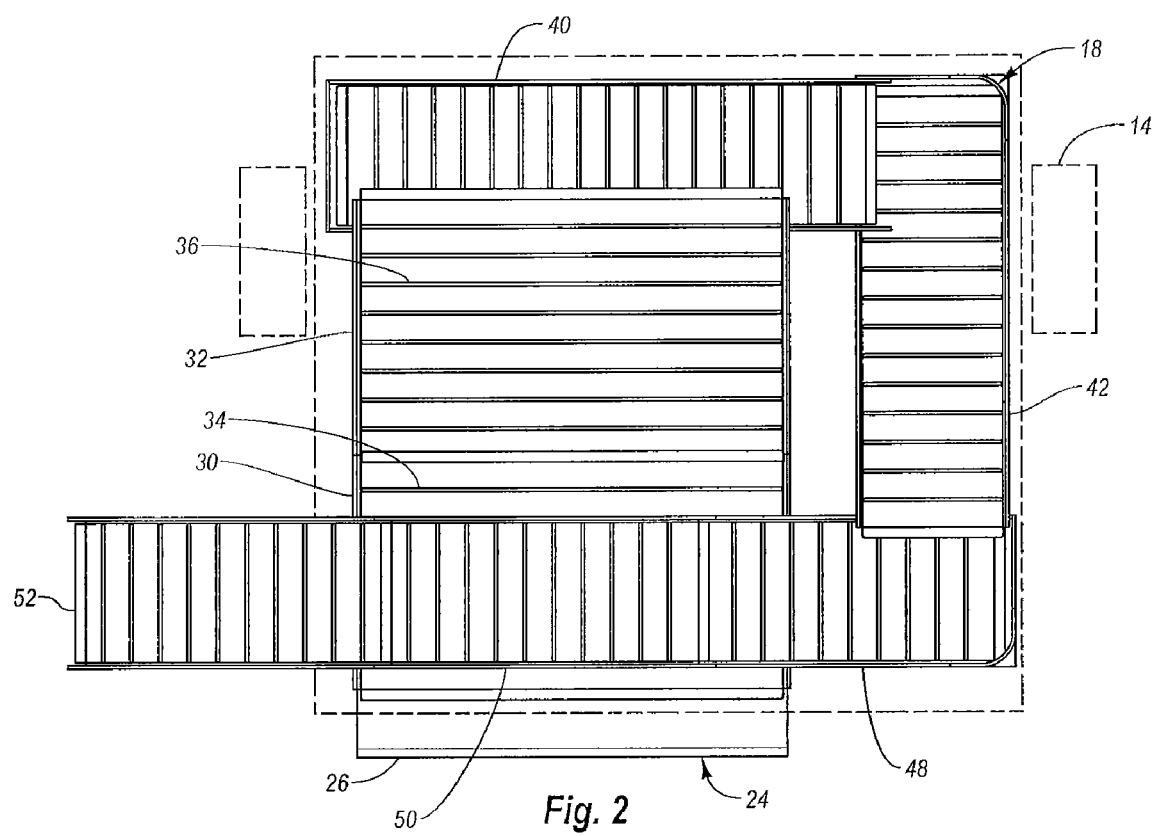
FIG. 2 is a top view of the conveyor system of the harvester of FIG. 1.

Potatoes from elevator conveyor 42 are dropped onto a return-flow conveyor 48 (FIG. 2). As described more fully below, the return-flow conveyor can be configured to selectively divert potatoes for recirculation through the conveyor system. When potatoes are not being recirculated, the potatoes are loaded onto a boom conveyor 50 to be loaded on a truck and hauled away. Boom conveyor 50 or a portion of boom 50 can be raised or lowered for piling the potatoes on a truck and/or for retracting the boom during transport of the harvester 10.

Potato harvester 10 can include any other components useful for digging and/or separating tubers from dirt, rocks, and vines. For example, potato harvester 10 can include a drive assembly that connects to the power take off (PTO) system of a tractor. The PTO can be used to turn the various conveyor belts and operate the blower 44. Harvester 10 can also include a hydraulic system that connects to the hydraulic system of a tractor. The hydraulic system of the harvester can be used to raise and lower the digger bed 24 or boom 50 and/or to selectively engage or disengage one or more conveyor belts in the conveyor system and/or for actuating return-flow conveyor 48 for selectively recirculating potatoes.

FIG. 2 provides a top view of the conveyor system 18 of example harvester 10. Conveyor system 18 shows digger bed 24, which includes digger blade 26, primary conveyor 30 and secondary conveyor 32. Digger bed 24 is typically wider than the other conveyor sections in conveyor system 18 to enable better separation of the potatoes, vines, and dirt. Primary chain 34 and secondary chain 36 can be optimized for providing maximum separation between dirt, potatoes, and vines.

The flow of crop traveling in conveyor system 18 begins at digger blade 26 and continues over primary chains 34 and secondary chains 36. Potatoes then collect on cross conveyor 40 and are transported to elevator conveyor 42. Elevator conveyor 42 carries the potatoes toward the front of the harvester and raises the potatoes in elevation. The potatoes are then dropped onto return-flow conveyor 48. The potatoes the cross over the digger bed on boom conveyor 50. Boom conveyor 50 provides an outlet 52 for unloading the potatoes onto a truck to be hauled away.

Cross conveyor 40, elevator conveyor 42, return flow conveyor 48, and boom conveyor 50 are configured for transporting and elevating the potatoes to a height and position on the harvester that is suitable for loading the potatoes on a truck. These sections of conveyor system 18 are typically optimized for preventing potatoes from rolling back in the system and protecting potatoes from being bruised.

The recirculation mechanism of the invention for temporarily storing potatoes on harvester 10 can be positioned anywhere along conveyor system 18. The point at which the potatoes are diverted and the point at which the potatoes begin recirculating in conveyor system 18 determines the amount of the conveyor system that is used for temporary storage. Consequently, for maximum storage, the potatoes can be diverted at a point in the boom conveyor or just before the boom conveyor and returned to the digger bed or the ground directly in front of the digger bed (i.e., the ground between the tractor and the digger). Although this configuration provides maximum storage, other more limited configurations can be used if desired.

The amount of crop that can be temporarily stored on the harvester will depend on the length of the conveyor system, the percentage of the conveyor system being utilized for temporary storage, and the number of times the potatoes are recirculated. For example, if the potatoes are allowed to recirculate one time, various sections of the potato harvester will be double loaded with potatoes. In an example embodiment, the time it takes for potatoes to make a complete recirculation is about 30 seconds. This amount of time is generally sufficient to allow an exchange of trucks or to dig through a section of field where the truck cannot follow along.

The harvester can be designed to hold more than one cycle of recirculating potatoes. However, harvesters that can hold potatoes for several cycles may need to be reinforced to hold the additional weight and/or have conveyor sidewalls with additional height to prevent spillover.

Figure 3:
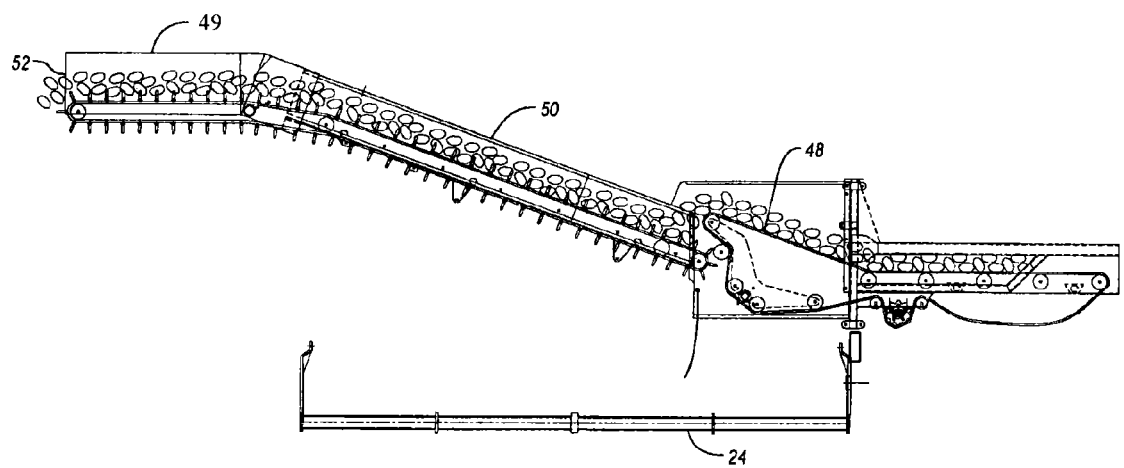
FIG. 3 is an elevational cross-sectional view of the conveyor system of FIG. 1 showing the return flow conveyor in a first operating configuration for transporting tubers to the boom conveyor.
Figure 4:
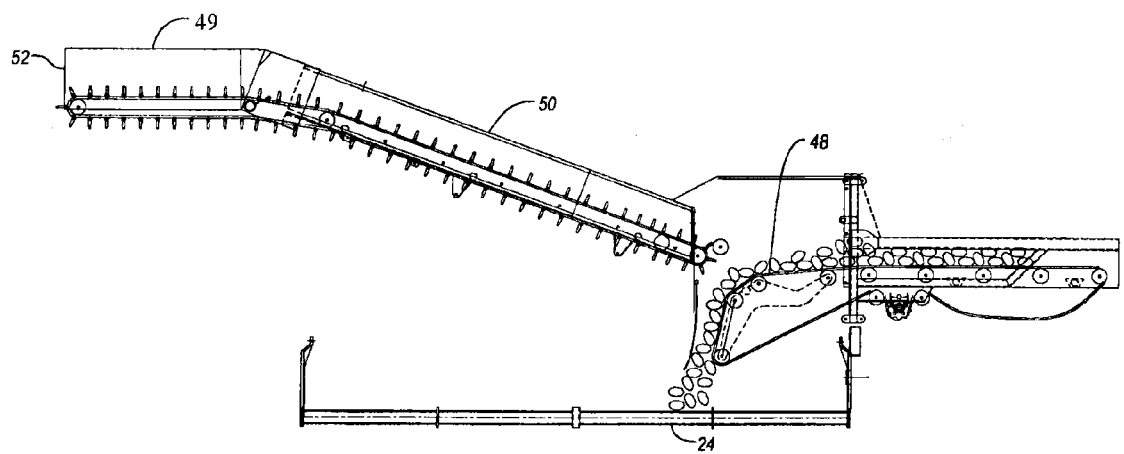
FIG. 4 is an elevational cross-sectional view of the conveyor system of FIG. 1 showing the return-flow conveyor in a second operating configuration for diverting tubers back to the digger bed.

Any mechanism can be used to recycle tubers within conveyor system 18. FIGS. 3-8 illustrate an example embodiment for recirculating tubers on conveyor system 18. As shown in FIGS. 3 and 4, return-flow conveyor 48 can be selectively positioned in a first position (FIG. 3) and a second position (FIG. 4).

In the first position (FIG. 3), potatoes are dropped onto boom conveyor 50 where they travel toward outlet 52. Potatoes traveling past outlet 52 are unloaded from potato harvester 10 onto a truck. Arm portion 49 of boom conveyor 50 can be moved up and down to adjust the height of potatoes being unloaded from harvester 10.

FIG. 4 shows return-flow conveyor 48 in a second position that diverts potatoes from return-flow conveyor 48 to digger bed 24. Potatoes diverted to digger bed 24 are recirculated on harvester 24, thereby temporarily storing the recirculating potatoes.

Figure 5:
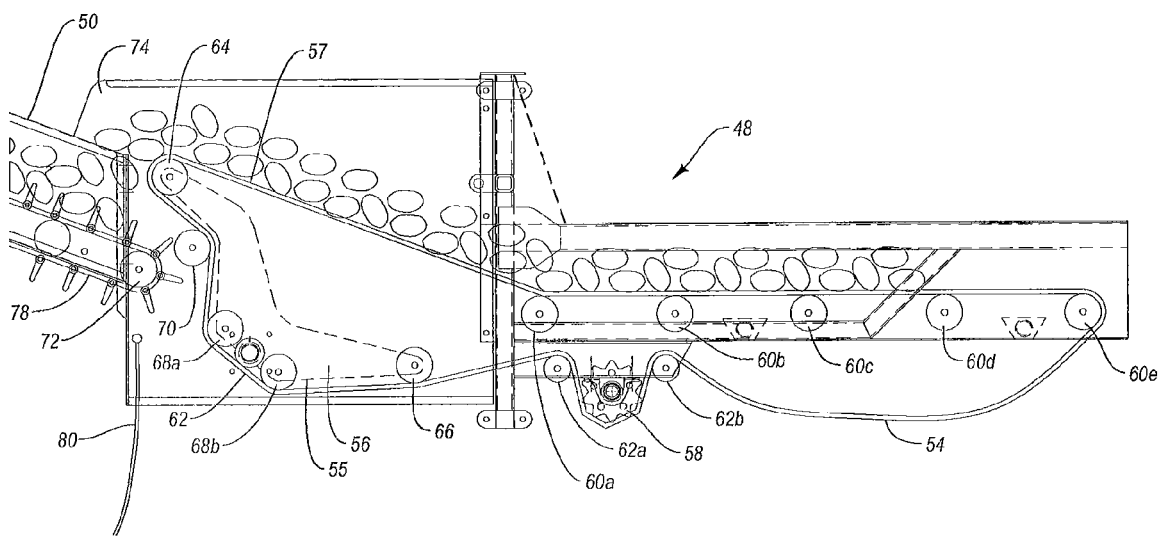
FIG. 5 shows the return-flow conveyor as positioned in FIG. 3 in more detail.

FIG. 5 illustrates return-flow conveyor 48 in more detail. In an example embodiment, return-flow conveyor includes a conveyor belt 54 that wraps around a movable roller assembly 55, a drive mechanism 58, and a plurality of fixed rollers (e.g., rollers 60a-60e). The belt and rollers create a conveyor bed 57 that transports potatoes.

Fixed rollers 60a-60e support belt 54 along a flat section of conveyor 48, which receives potatoes from elevator conveyor 42 (FIG. 2). Drive mechanism 58 and rollers 62a and 62b are configured to pull belt 54 to cause belt 54 to rotate in a counter-clockwise direction.

Movable roller assembly 55 is rotatably mounted to harvester 10 on axle 62. Movable roller assembly 55 includes one or more mounting brackets (e.g., wing-shaped mounting bracket 56), an upper roller 64, a lower roller 66, and pivot rollers 68a and 68b.

Upper roller 64, lower roller 66, and pivot rollers 68a and 68b are spaced apart and mounted between a pair of wing-shaped brackets. (e.g., bracket 56). Upper roller 64 extends over tail end 72 of conveyor boom 50 such that potatoes falling off conveyor 48 are caught by boom conveyor 50. Sidewalls (e.g. side wall 74) can be placed adjacent return flow conveyor 48 and extend beyond upper roller 64 to guide potatoes falling onto boom conveyor 50.

Roller 70 is fixed to harvester 10 adjacent to the tail end 72 of boom conveyor 50. Roller 70 prevents conveyor belt 54 from rubbing against boom conveyor belt 78. Pivot rollers 68a and 68b are mounted on bracket 56 on either side of axle 62 to provide clearance between belt 54 and bracket 56.

Figure 6:
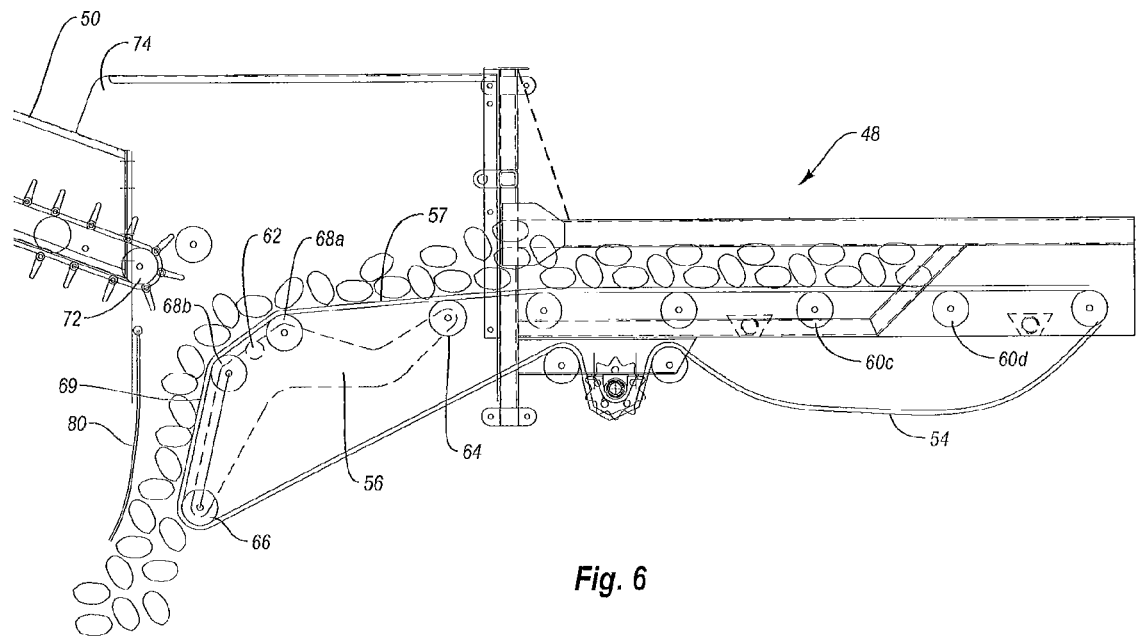
FIG. 6 shows the return-flow conveyor as positioned in FIG. 4 in more detail.

Roller assembly 55 can rotate between a boom loading position and a recirculating position. FIG. 5 shows roller assembly 55 in the boom loading position and FIG. 6 shows roller assembly 55 in the recirculating position. Roller assembly 55 is moved from the boom loading position to the recirculating position by rotating bracket 56 clockwise (i.e., opposite the direction of the rotation of belt 54).

In the recirculating position, upper roller 64 is moved away from boom 50 to create a gap between return-flow conveyor 48 and boom conveyor 50. Pivot rollers 68a and 68b and lower roller 66 form a ramp 69 that dumps potatoes from return-flow conveyor 48 onto digger bed 24 where the potatoes can be recirculated through the conveyor system. A flap 80 can be used to cushion the fall of potatoes pouring over conveyor 48.

The rotation of roller assembly 55 changes the length and/or angle of conveyor bed 57. In the boom loading position (FIG. 5) the conveyor bed 57 extends from the belting on upper roller 64 to the belting between fixed rollers 60c and 60d. In this position, a portion of conveyor bed 57 is substantially flat and the last section slopes upward.

With roller assembly 55 in the recirculating position (FIG. 6), conveyor bed 57 extends from the belting on roller 66 to the belting between fixed rollers 60c and 60d. With roller assembly 55 in the recirculating position a portion of conveyor bed 57 slopes downward (i.e. ramp 69).

Any suitable mechanism can be used to cause rotation of roller assembly 55. In one embodiment bracket 56 is rigidly attached to axle 62 and roller assembly 55 can be rotated by turning axle 62. For example, axle 62 can be rotated using a drive mechanism that is coupled to the PTO of a tractor.

In an alternative embodiment, axle 62 can be fixed with respect to the frame of harvester 10 and roller assembly 55 can be rotated about axle 62. In this embodiment a cam mechanism can be attached to mounting bracket 56 to cause the rotation of bracket 56. For example, bracket 56 can be rotated using a hydraulic ram. In yet another embodiment, mounting bracket 56 can be rotated manually.

Figure 7:
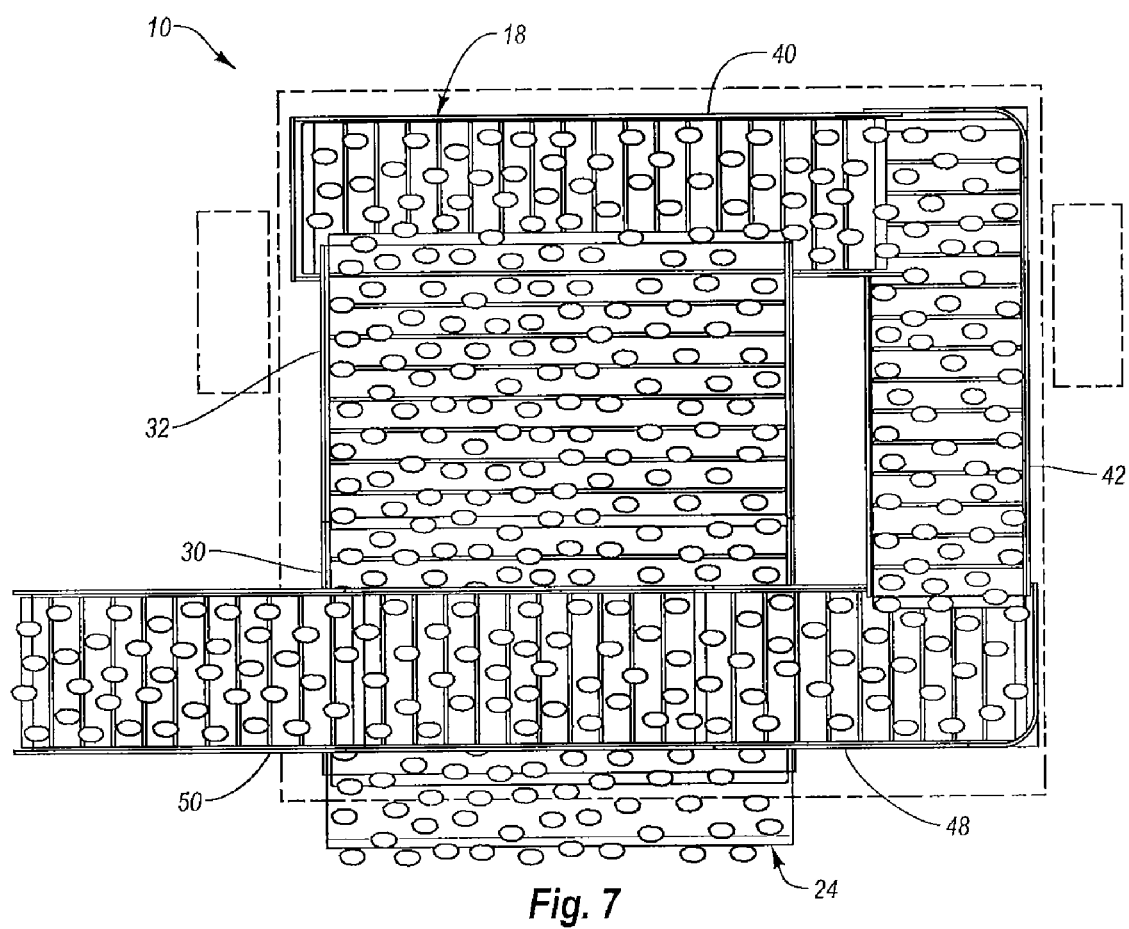
FIG. 7 is a top view of the conveyor system of FIG. 2 showing potato loading with the return-flow conveyor in a boom-loading configuration.

FIG. 7 illustrates the conveyor system 18 of harvester 10 with the harvester in use. In FIG. 7, return-flow conveyor 48 is in a boom loading configuration (i.e., the configuration where potatoes are being unloaded from the harvester onto a truck). Potatoes are uprooted and sifted on digger bed 24 as they move toward the back of harvester 10, then transported across the back of harvester 10 on cross conveyor 40, and transported up and toward the front of harvester 10 on elevator 42. From elevator 42 the potatoes are dumped onto return-flow conveyor 48 and then onto boom conveyor 50 where the potatoes are unloaded from the harvester.

Figure 8:
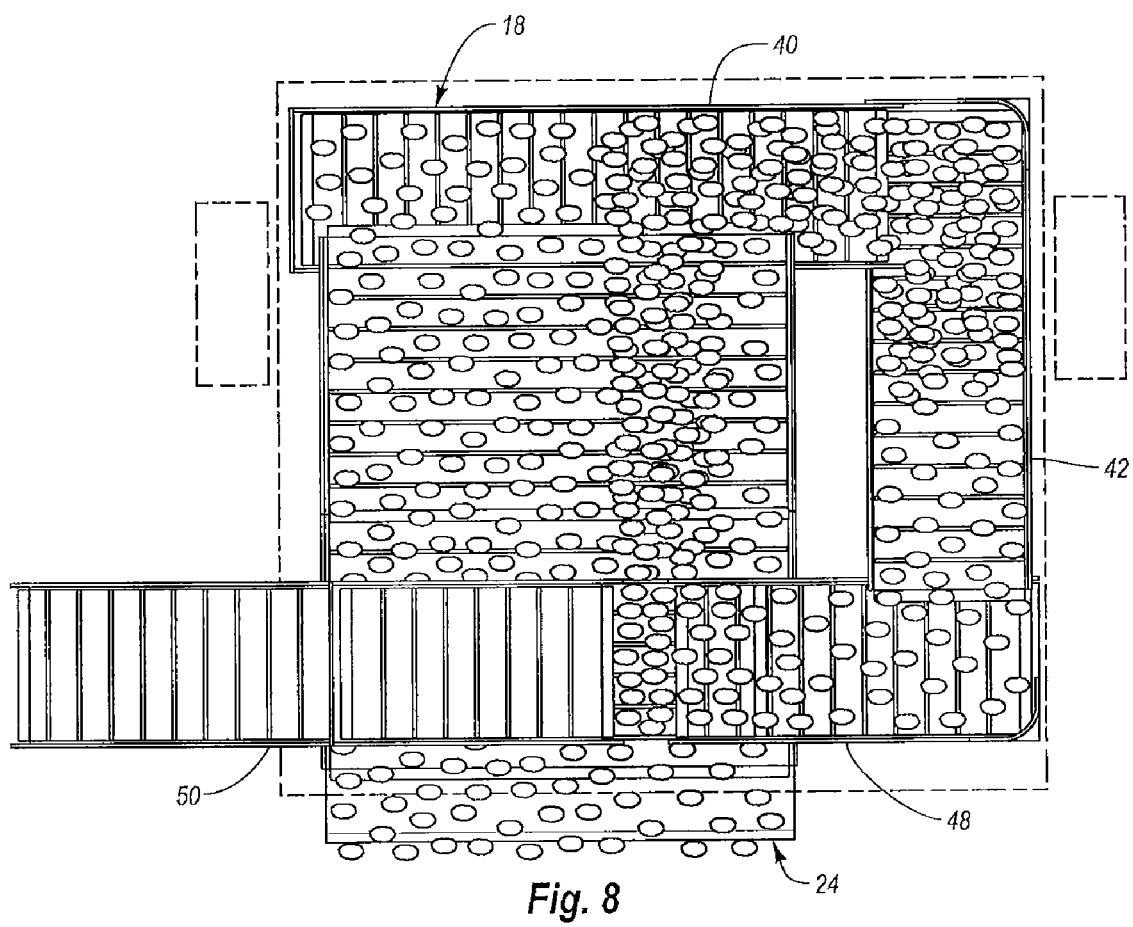
FIG. 8 is a top view of the conveyor system of FIG. 2 showing potato loading with the return-flow conveyor in a recirculating configuration.

FIG. 8 illustrates the use of the harvester 10 with the conveyor system in a recirculating configuration. In this configuration potatoes are being uprooted and sifted from dirt on digger bed 24. In addition, potatoes that have been dug and traveled on the conveyor system are recirculated once they reach boom elevator 50. The recirculating potatoes are indicated in FIG. 8 by the higher density of potatoes. In this example, the recirculating potatoes have reached about half way up elevator 42.

Figure 9:
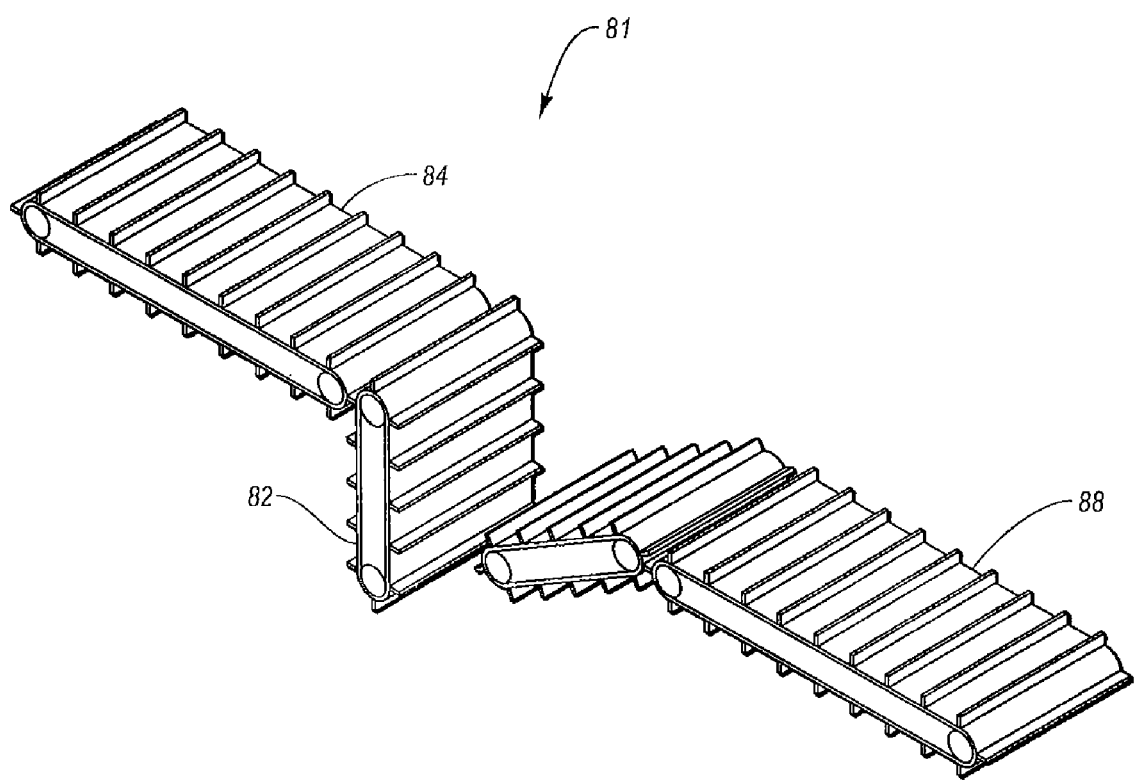
FIG. 9 illustrates an alternative return-flow mechanism according to the invention.

FIG. 9 illustrates an alternative return flow mechanism where recirculation is accomplished by creating a gap between a return flow conveyor and the boom conveyor. In this embodiment, a conveyor system 81 includes a boom conveyor 84 and a return-flow conveyor 88. The tail portion 82 of boom conveyor 84 and a lead portion of return-flow conveyor 88 can be collapsible to create a gap therebetween. Tail portion 82 can be lowered such that it is moved out from underneath return-flow conveyor 88. With tail portion 82 moved out of the way, lead portion 86 of return flow-conveyor 88 can be lowered without hitting tail portion 82. In the lowered position, lead portion 86 is configured and positioned to drop tubers onto a digger bed of the harvester such that the tubers are recirculated on the harvester. In yet another alternative embodiment, instead of being collapsible, tail portion 82 can have a retractable roller that moves in the same plane as boom conveyor. Retracting the tail roller allows the tail portion to move out of the way for lead portion 86 of return-flow conveyor 88 to be lowered.

Figure 10:
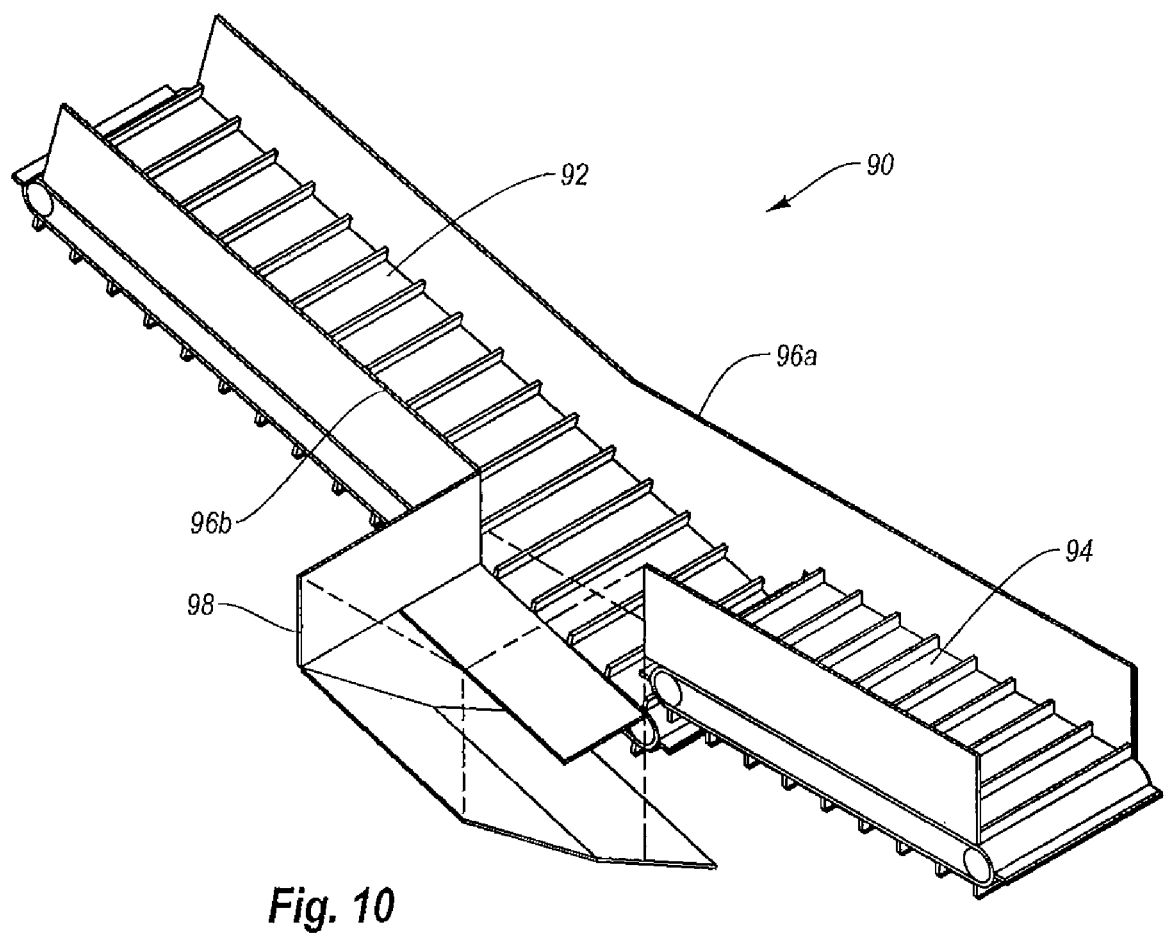
FIG. 10 illustrates yet another alternative return-flow mechanism according to the invention.

FIG. 10 illustrates yet another alternative embodiment for diverting tubers from a conveyor system. Conveyor system 90 includes a boom conveyor 92 and a return flow conveyor 94. Sidewalls 96a and 96b are configured to divert tubers into a return chute 98 if the tubers begin to pile up at the interface between boom conveyor 92 and return-flow conveyor 94. Tubers entering return chute 98 are delivered to the digger bed, the ground directly in front of the digger bed, or another earlier position within the conveyor system 90, thereby recirculating the tubers and temporarily storing them on the harvester.

To selectively cause tubers to enter return chute 98, boom conveyor is configured to be stopped while return-flow conveyor 94 and the other prior conveyors in the conveyor system 90 continue operating. Stopping boom conveyor 92 while operating return-flow conveyor 94 causes tubers to collect and spill over into return chute 98.

Those skilled in the art will recognize that there are many other mechanisms that can be used to recirculate tubers on a harvester. For example, the side walls of a conveyor can be lowered to allow tubers to be selectively spilled into a return chute and/or movable sheeting can be selectively moved into the path of the conveyor system to divert the tubers to a desired location.

In one embodiment, the recirculation mechanism of harvester 10 provides a return flow with a limited amount of free-fall or provides cushioning for preventing tubers from becoming bruised as the tubers travel to an earlier point in the conveyor system. In one embodiment, the harvester is configured to allow a free fall of tubers of less than about 100 cm, more preferably less than about 50 cm. The free fall can be limited by lowering the conveyor belts (e.g. return-flow conveyor 48 (FIG. 4) or return flow conveyor 88 (FIG. 9)) and/or by providing a chute or slide (e.g., return chute 98 (FIG. 10).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A root-crop harvester capable of temporarily storing an amount of tubers, comprising:
    a digger bed configured to unearth tubers; and
    a conveyor system comprising a plurality of conveyors that transport tubers on the root-crop harvester, the conveyor system having selectable first and second operating configurations in which,
        in the first operating configuration the conveyor system transports tubers from the digger bed to an outlet where the conveyor system unloads tubers from the root-crop harvester; and
        in the second operating configuration the conveyor system transports tubers along the conveyor system for a period of time and thereafter diverts tubers to the digger bed or the ground directly in front of the digger bed, thereby recirculating tubers on the root-crop harvester.

2. A harvester as in claim 1, in which the conveyor system comprises a first conveyor and a second conveyor, wherein in the first operating configuration the first conveyor drops tubers onto the second conveyor and wherein upon selecting the second operating configuration, the first conveyor and/or the second conveyor are moved relative to one another to create a gap therebetween that allows tubers to drop from the first conveyor without being loaded onto the second conveyor.

3. A harvester as in claim 2, in which in the second operating configuration the first conveyor drops tubers onto the digger bed with a free fall distance of less than 100 cm.

4. A harvester as in claim 1, in which the conveyor system comprises a boom conveyor that can be stopped while other conveyors in the conveyor system continue operating.

5. A harvester as in claim 1, in which tubers that have been diverted are allowed to free fall for a distance of less than 100 cm.

6. A harvester as in claim 1, in which tubers that have been diverted are allowed to free fall for a distance of less than 50 cm.

7. A harvester as in claim 1, in which tubers that have been diverted travel down a chute, thereby reducing the free fall distance of tubers being diverted.

8. A harvester as in claim 1, wherein the conveyor system includes a digger bed, a cross conveyor, an elevator conveyor, and a boom conveyor, wherein the second operating configuration diverts tubers at or before the boom conveyor and wherein the recirculated tubers are recirculated on the digger bed, the cross conveyor, and the elevator conveyor.

9. A root-crop harvester comprising a conveyor system supported by a frame, the conveyor system including at least one conveyor, wherein the conveyor comprises:
 a conveyor belt that forms a continuous loop, wherein an upper portion of the conveyor belt provides a conveyor bed that moves root-crop during use;
 at least one roller mounting bracket positioned within the loop of the conveyor belt, wherein the mounting bracket can be selectively rotated within the loop of the conveyor belt between a first position and a second position; and
 an upper roller and a lower roller attached to the roller mounting bracket, wherein rotating the roller mounting bracket causes a change in the length and/or the angle of the conveyor bed that diverts tubers from the conveyor bed to the digger bed or the ground directly in front of the digger bed.

10. A root crop harvester as in claim 9, wherein,
 with the mounting bracket in the first position, the upper roller is the lead roller of the conveyor bed and the lower roller is positioned underneath the conveyor bed; and
 with the mounting bracket in the second position the lower roller is the lead roller of the conveyor bed.

11. A harvester as in claim 9, in which the mounting bracket is rotatably mounted to the frame on an axle, wherein the axle is fixed to the mounting bracket and rotating the axle causes rotation of the mounting bracket.

12. A harvester as in claim 9, in which the mounting bracket is rotatably mounted to the frame on an axle, wherein the axle is fixed to the frame and the mounting bracket rotates about the axle.

13. A harvester as in claim 12, in which a hydraulic ram is connected at a first end to the mounting bracket and at a second end to the frame of the harvester and actuating the hydraulic ram moves the mounting bracket between the first position and the second position.

14. A harvester as in claim 9, wherein the conveyor system includes a digger bed, a cross conveyor, and an elevator conveyor positioned before the boom conveyor in the conveyor system.

15. A root-crop harvester, comprising:
 a digger bed;
 an elevator conveyor;
 a boom conveyor; and
 a return-flow conveyor positioned between the elevator conveyor and the boom conveyor, wherein the return-flow conveyor can be selectively moved between,
  a first position in which tubers traveling on the return-flow conveyor are dumped onto the boom conveyor; and
  a second position in which tubers traveling on the return-flow conveyor are dumped onto the digger bed or onto the ground directly in front of the digger bed.

16. A harvester as in claim 15, in which the return-flow conveyor comprises,
 a conveyor belt that forms a loop;
 a roller assembly positioned within the loop of the conveyor belt, the roller assembly being comprised of one or more roller mounting brackets and a plurality of rollers connected thereto, wherein the roller assembly pivots on an axle to rotate the roller assembly and wherein rotation of the roller assembly allows the return-flow conveyor to move between the first and second positions.

17. A harvester as in claim 15, in which the height of the return-flow conveyor in the second position during use is such that tubers free fall for a distance of less than 100 cm before landing on the digger bed or the ground.

18. A harvester as in claim 15, in which the height of the return-flow conveyor in the second position during use is such that tubers free fall for a distance of less than 50 cm.

19. A harvester as in claim 15, in which the digger bed comprises a primary conveyor and a secondary conveyor.

20. A harvester as in claim 15, in which the digger bed, elevator conveyor, return-flow conveyor, and boom conveyor are configured to uproot potatoes, substantially separate the uprooted potatoes from dirt and vines, and transport the potatoes to the boom conveyor for unloading the potatoes onto a truck.

\* \* \* \* \*